UNITED STATES PATENT OFFICE.

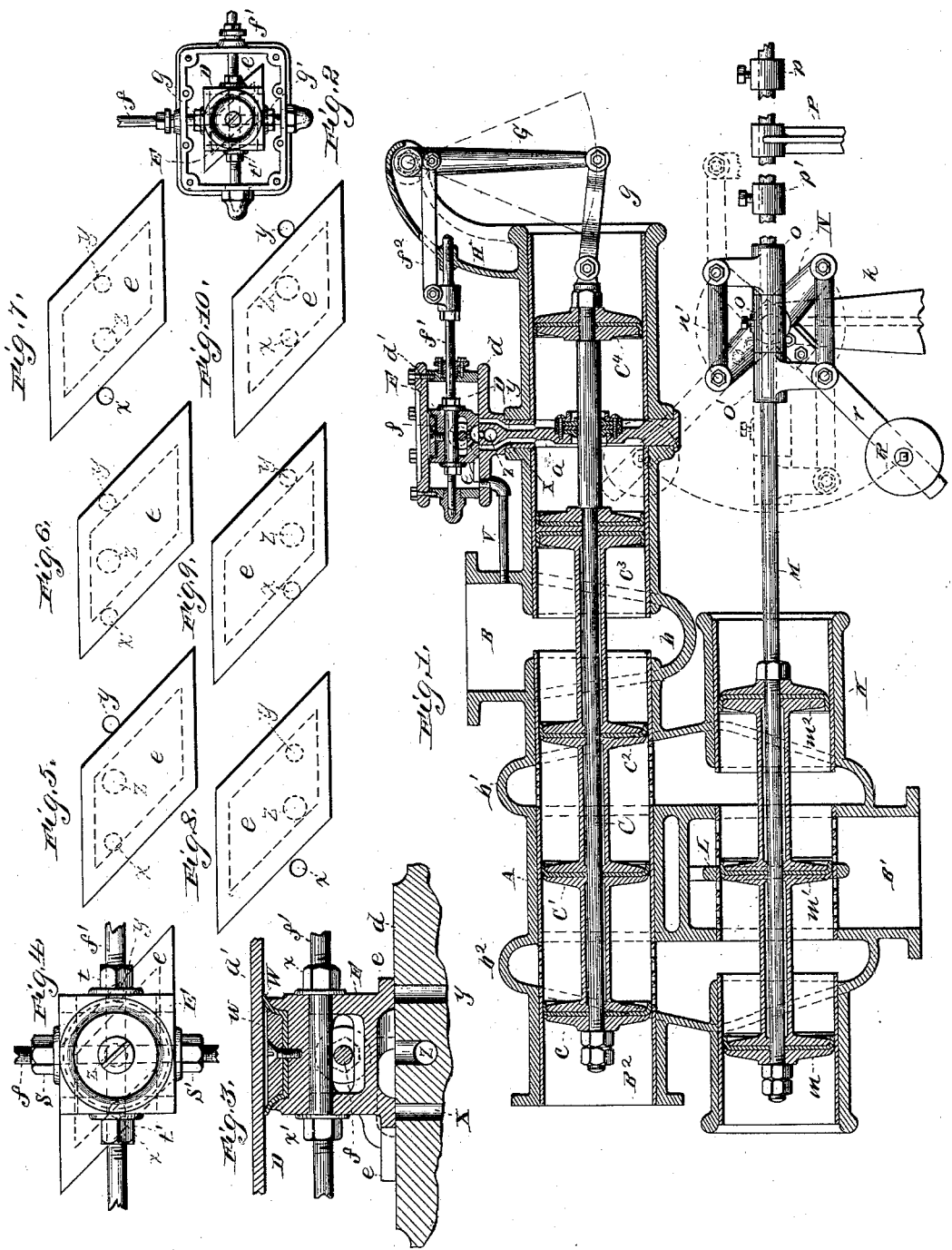

HUGO W. FORSLUND, OF CHICAGO, ILLINOIS, ASSIGNOR, BY DIRECT AND MESNE ASSIGNMENTS, TO THE STANDARD ELEVATOR COMPANY AND WILLIAM H. WELLS, JR., BOTH OF SAME PLACE.

HYDRAULIC VALVE.

SPECIFICATION forming part of Letters Patent No. 463,211, dated November 17, 1891.

Application filed August 18, 1890. Serial No. 362,364. (No model.)

*To all whom it may concern:*

Be it known that I, HUGO W. FORSLUND, a citizen of the United States, residing at Chicago, in the county of Cook and State of Illinois, have invented certain new and useful Improvements in Hydraulic Valves; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to hydraulic valves. Its purpose is to provide a primary or auxiliary valve which shall be easy of control and shall be positive and automatic in its action and a main valve which shall be perfectly balanced and certain in its action.

The drawings show in Figure 1 a longitudinal section of the entire device, the valve-rods and operating-levers being in elevation; Fig. 2, a plan view of the primary valve with the top of the valve-chest removed; Fig. 3, an enlarged vertical section of the primary valve; Figs. 4 to 10, inclusive, details showing the various positions of which the primary valve is capable.

The cylinder A carries the main valve, and, as shown, is lined with brass tubing.

The passage B is connected with the water service and the passage B′ with the motor.

$B^2$ is an exhaust-passage.

The passage B is connected with the cylinder A by means of a hollow belt $b$ encompassing the latter, whereby ample provision is made for the flow of water. A belt $b′$ encompasses the cylinder A and extends downwardly, so as to connect with the passage B′, and a third belt $b^2$, similar to the belt $b′$, connects the passage B′ with the exhaust-passage $B^2$. The valve-stem C extends through the center of the cylinder A and carries five pistons $c$ $c′$ $c^2$ $c^3$ $c^4$, fitting closely within the cylinder A. The piston $c$, fixed to the outer end of the stem C, closes the exhaust-passage $B^2$. The movement of the valve-stem is sufficient to carry this piston across the belt $b^2$, thereby opening connection between the exhaust-passage and the motor. The piston $c′$ is fixed upon the stem C in such a position as to play between the belts $b′$ and $b^2$, preventing communication between them through the cylinder A. The piston $c^2$ is fixed upon the valve-stem, so as to play between the belt $b$ and the remote side of the belt $b′$. The piston $c^3$ is located upon the side of the passage B opposite from the piston $c^2$. Beyond the piston $c^3$ a rigid diaphragm $a$ is placed across the cylinder A, having a stuffing-box for the accommodation of the valve-stem C. Beyond this diaphragm the piston $c^4$ is fixed upon the stem C. The movement of the valve is secured by hydraulic pressure alternately upon the opposite sides of the diaphragm $a$, acting upon the pistons $c^3$ and $c^4$, and is controlled by the primary or auxiliary valve, which I will now describe.

A rectangular valve-chest D is located near the cylinder A, and is connected therewith upon each side of the diaphragm $a$ by the channels or ducts $x$ $y$, and is provided with an exhaust-port $z$, located between these two channels. The wall $d$ of the valve-chest, perforated by the channels named, may, if desired, be cast integrally with the diaphragm $a$, the channels being cored therein, the diaphragm being interposed between two sections of the cylinder A. A pressure of water is secured within the valve-chest D through the pipe V, communicating with the source of pressure within the passage B, as shown. The valve E is fitted within the chest D, so as to have a bearing upon the side $d$ and the opposite side $d′$, but coming in contact with no other side of the chest D, so that the water circulates freely about it, balancing the valve. The face $e$ of this valve is rhomboidal in form. In the central portion of its face there is a cavity, as shown in Fig. 3, so as to form an inclosed chamber with the wall $d$, this chamber being also rhomboidal in form. A flat margin remains about the entire face of the valve, slightly exceeding in width the diameter of the channels $x$ $y$, which it is intended to cover. These channels are so located that they may be simultaneously covered by opposite sides of the valve-face. The exhaust-channel $z$, being located between the channels $x$ $y$, opens into the chamber formed by the cavity in the face of the valve. Both channels $x$ $y$ are covered by bringing the valve to one of the positions shown in Figs. 1, 4, 6, and 9. The valve has two motions, the one at a right angle to a line connecting the centers of the channels $x$ $y$ and controlled by the operator by means of a valve-rod $f$, and the other parallel with such a line and controlled automatically by means of a rod $f'$, as hereinafter described. From its central position, Fig. 4, the operator may shift the valve to the position shown in Fig. 5, whereby the water-pressure is communicated to the piston $c^4$ through the channel $y$. The channel $x$, being uncovered within the chamber of the valve, is brought into communication with the exhaust-passage $z$. The effect is to shift the main valve to the right, opening the exhaust-passage $B^2$ by bringing the piston $c$ to the opposite side of the belt $b^2$. The valve may from the center be shifted in the opposite direction, so as to bring it into the position indicated by Fig. 8, with the opposite effect upon the main valve. When the main valve has been thrown to the desired position, it is necessary that it be held there firmly by cutting off the pressure and exhaust through the channels $x$ $y$. This is accomplished automatically by the following means: The stem C is prolonged beyond the cylinder A, the extension $g$ being pivotally attached to the main portion of the stem and also to the free end of the lever G, which swings from a bracket H, extending upwardly from the cylinder A. A connecting-rod $f^2$ is pivotally attached to the rod $f'$ and to the lever G. By the action of this mechanism the valve E is moved back and forth perpendicular to its line of movement by the operator. As the ducts $x$ $y$ are affected only by the sides of the valve which are oblique to the directions of its movements, they are always uncovered by the use of the rod $f$ and covered by the action of the rod $f'$. Assuming the valve E to have been shifted from its central position to that indicated by Fig. 5, it will be seen that when the main valve has been thrown to the left the valve E will have been moved by the action of the lever G to the position shown in Fig. 6, and the exhaust to the main valve will remain open until the operator draws out the rod $f$, shifting the valve E to the position shown in Fig. 7. The pressure is now conveyed to the piston $c^3$ through the channel $x$. The channel $y$ is brought into communication with the exhaust $z$. The main valve is brought back to the position shown in Fig. 1. The motor is brought to rest, and at the same instant, by the action of the lever G, the valve E is restored to the position shown in Fig. 4. If from the central position of the valve E it is shifted by the operator to the position shown in Fig. 8, so that the piston $c^2$ is carried beyond the belt $b'$, the movement of the valve-stem C will have shifted the valve E to the position shown in Fig. 9, and the pressure is applied to the motor until the operator by an inthrust of the rod $f$ shifts the valve E to the position indicated in Fig. 10, when the main valve is thrown to the right, stopping the motor, and by its movement again restoring the valve E to its central position, Fig. 4. The rods $f$ and $f'$ pass through oblong slots in the body of the valve E. Nuts $s$ $s'$ $t$ $t'$ are carried upon these rods and are screwed up to the several faces of the valve E, their surfaces having a sliding contact therewith, so that when the valve is moved by means of the rod $f$ it slides between the nuts $t$ and $t'$, and when moved by means of the rod $f'$ it slides between the nuts $s$ and $s'$. It will be seen that the operator may throw the valve E in an opposite direction to reverse the motion of the motor. If this is done, the exhaust-chamber $z$ will be covered by the margin of the valve-face. To prevent it from being completely covered the mouth of this chamber should be made larger than the ducts $x$ $y$.

Though I have shown and described a species of D-valve having a rhomboidal face, I do not desire to be limited to that particular form. The essence of the invention lies in the double successive action of the valve in two directions, whereby the movement of the valve in one direction is followed or succeeded by a movement of such valve in a direction at right angles to the first movement. This action is particularly important in elevators, for each movement of the controlling lever or cable is the reverse of the preceding one, because the position of the valve has been changed with reference to the line of movement first given to it by the controlling lever or cable before the latter is again brought into action. It will be readily seen that the exact rhomboidal form might be departed from without preventing the accomplishment of this purpose. I prefer, however, the form described as being the most simple.

A supplementary top and bottom stop-valve is interposed between the main valve and the motor when the device is applied to an elevator and consists of the pistons $m$, $m'$, and $m^2$, fixed upon the stem M and working in a cylinder K. This cylinder is encompassed by the belts $b'$ and $b^2$ and by a belt L, connected with the passage $B'$. The piston $m'$ plays across the belt L, so as to close the connection between it and the two belts $b'$ and $b^2$ alternately. The pistons $m$ and $m^2$ are located beyond the belts named and simply serve to balance the valve. This valve is actuated by means of an arm P, projecting laterally from the piston-rod of the motor (not shown) and sliding upon the valve-stem M between the collars $p$ and $p'$, which are rigidly fixed upon the valve-stem by set-screws, these collars being so located that the arm P comes in contact with them, respectively, at the extreme of the out and in stroke of the motor.

The piston $m'$ is returned to its central position, as shown in Fig. 1, when the arm P is removed from either of the collars $p$ and $p'$ by the return stroke of the motor by means of a weight R, carried upon the main arm $r$ of a T-crank, which is pivoted to a bracket $k$, extending from the motor-cylinder. (Not shown.) The ends of the cross-arm N of the T-crank are linked to the sliding sleeves $o$ and $o'$, which are carried upon the valve-stem M, and which, when the piston $m'$ is in its central position, abut against the opposite sides of a collar O, fixed upon the valve-stem by a set-screw. When by the action of the arm P the valve-stem M is moved in either direction, the weight R is raised, as indicated by dotted lines, by the action of the collar O upon either one of the sleeves $o$ and $o'$. When this pressure upon the collar is relieved, the valve is returned to its central position by the descent of the weight R.

The operation of the stop-valve is as follows: In Fig. 1 this valve is shown in the position it assumes when the motor is not at either of the limits of its movement. In this position it affects neither the pressure nor the exhaust. Should either the induction or the exhaust ports be allowed to remain open until the motor has reached either of its limits of movement the piston $m'$ is moved to the right or to the left, as the case may be, by the action of the arm P, shutting off either the induction or the exhaust without regard to the position of the main valve. The automatic action of stop-valve always leaves the main valve free to reverse the movement of the motor.

To save the valve E from injury by wear I place a packing, preferably of leather, upon its back. The back of the valve is circular in form and depressed in the center. A circular piece of leather U, of greater diameter than the valve-back, is placed thereupon and forced into the depression by the screw $u'$, passing into the body of the valve and carrying the metal washer $u$. The leather packing is thereby interposed between the valve and the wall of the chest, and extending beyond the valve is forced against the wall by the water-pressure. The body of the valve E is rectangular in form to afford suitable bearings for the guide-nuts $s\ s'$ and $t\ t'$. The extensions to secure the rhomboidal face afford sufficient pressure to keep the valve snugly seated upon the wall $d$. It is clear that this pressure-surface may be of any desired extent or may be dispensed with entirely.

I have shown and described an improved automatic stop-valve and centering device for the same, but lay no claim thereto in this application, because I have filed an application Serial No. 405,833, dated September 16, 1891, for said invention not herein claimed, which application is a division and continuation of the present application so far as said invention is concerned and have done this for the purpose of preventing the detention of the other features shown and described in this application by an interference proceeding which has been instituted.

I claim—

1. The combination, with a fluid-motor, of a valve for controlling the same and two devices for successively moving such valve in two directions at angles one to another, one mechanism connecting one side of the valve with a moving part of the motor and the other mechanism extending to and under the control of manual power and connected to a side of the valve at an angle to the first-mentioned side, whereby the valve may be manually shifted by the operator in the elevator and be returned to its pristine position by a mechanism operating it from the motor, substantially as shown and described.

2. In a hydraulic motor, the combination, with pressure and exhaust ports, of a slide-valve, a chamber in the valve-face for connecting the exhaust-port with the pressure-ports, a plain margin about the chamber for covering the pressure-ports, two sides of the margin extending in lines oblique to a line connecting said ports, a rod for actuating the valve in one direction, and a rod connecting the valve with the motor, whereby it is automatically moved in a different direction, substantially as described, and for the purposes set forth.

3. In combination with a hydraulic motor-valve, a primary valve adapted to be automatically closed and having an actuating stem or rod operating in one line of direction, and a closing stem or rod operating in a different line of direction, said primary valve having a lateral movement upon each of said stems, substantially as described, and for the purpose set forth.

4. In combination with a hydraulic valve actuated by water-pressure, a primary-valve chest, a duct or passage leading thereto from the source of pressure, ducts or passages $x\ y$, leading therefrom to each end, respectively, of the valve-motor cylinder, an exhaust-passage from the valve-chest located between the ducts $x\ y$, a D-valve sliding between two opposite walls of the valve-chest and adapted to cover the ducts $x\ y$, the face of the valve being rhomboidal in form and having two of its sides oblique to a line through the centers of the ducts $x\ y$, a stem or rod for actuating the valve transversely to said line, and a second stem or rod for actuating the valve parallel to said line, substantially as described, and for the purpose set forth.

5. In a hydraulic motor-valve, the combination of a cylinder A, having an induction and an eduction port, a cylinder K, having a passage to the motor, two passage-ways connecting the two cylinders and located upon opposite sides of the passage to the motor and adjacent, respectively, to the induction and eduction ports, a balanced piston-valve reciprocating in the cylinder A and having a disk located between the two connecting passage-ways, disks adapted, respectively, to alternately open and close communication between the induction and eduction ports and the connecting passage-way adjacent thereto, and a balanced piston-valve reciprocating in the cylinder K and having a disk adapted to close communication between the passage to the motor and either of the connecting passage-ways, the valve in the cylinder A being adapted to voluntary control and the valve in the cylinder B being automatically actuated by the motor at each of the limits of its movement, substantially as described, and for the purpose set forth.

In testimony whereof I affix my signature in presence of two witnesses.

HUGO W. FORSLUND.

Witnesses:
JOHN C. WEBER,
J. A. BOMMHARDT.